July 17, 1923.  
F. J. TEMPLE  
SNAPPED CORN SEPARATOR  
Filed July 17, 1919   4 Sheets-Sheet 3
1,462,428
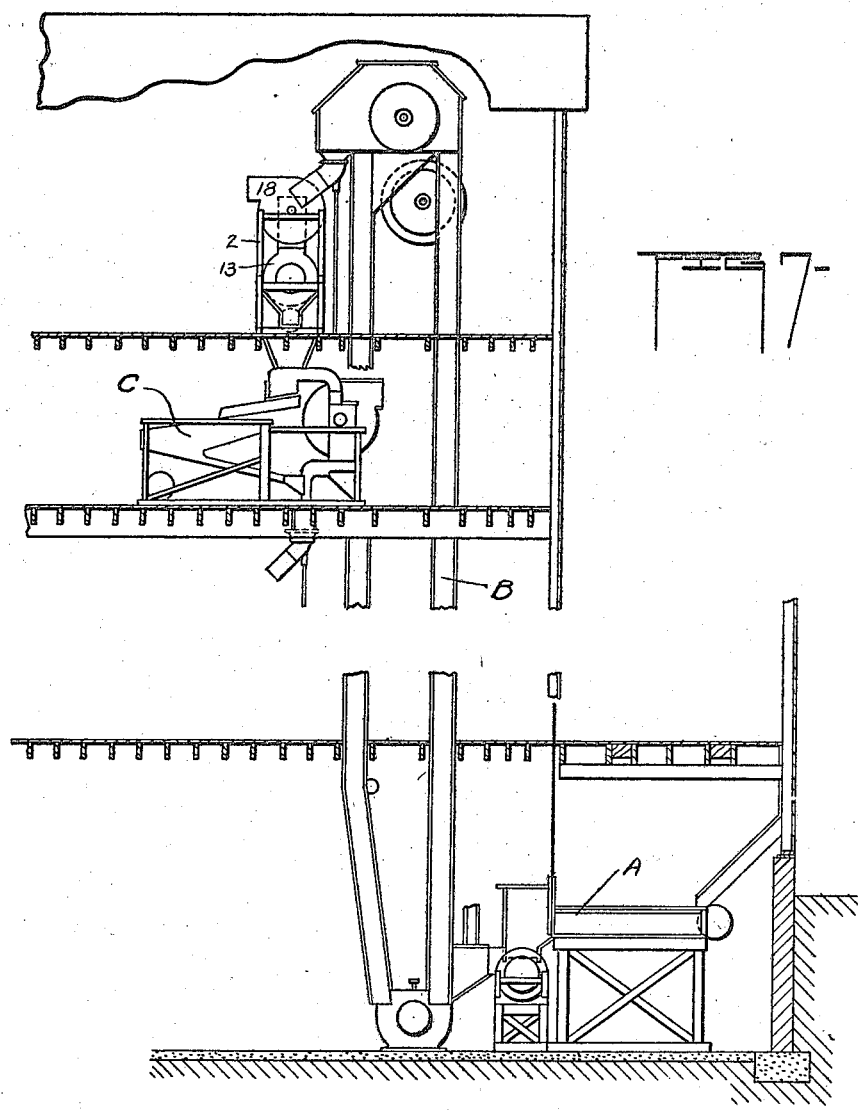
INVENTOR  
Frank J. Temple  
BY Chas. H. Laborte  
ATT'Y July 17, 1923.
F. J. TEMPLE
SNAPPED CORN SEPARATOR
Filed July 17, 1919
1,462,428
4 Sheets-Sheet 4
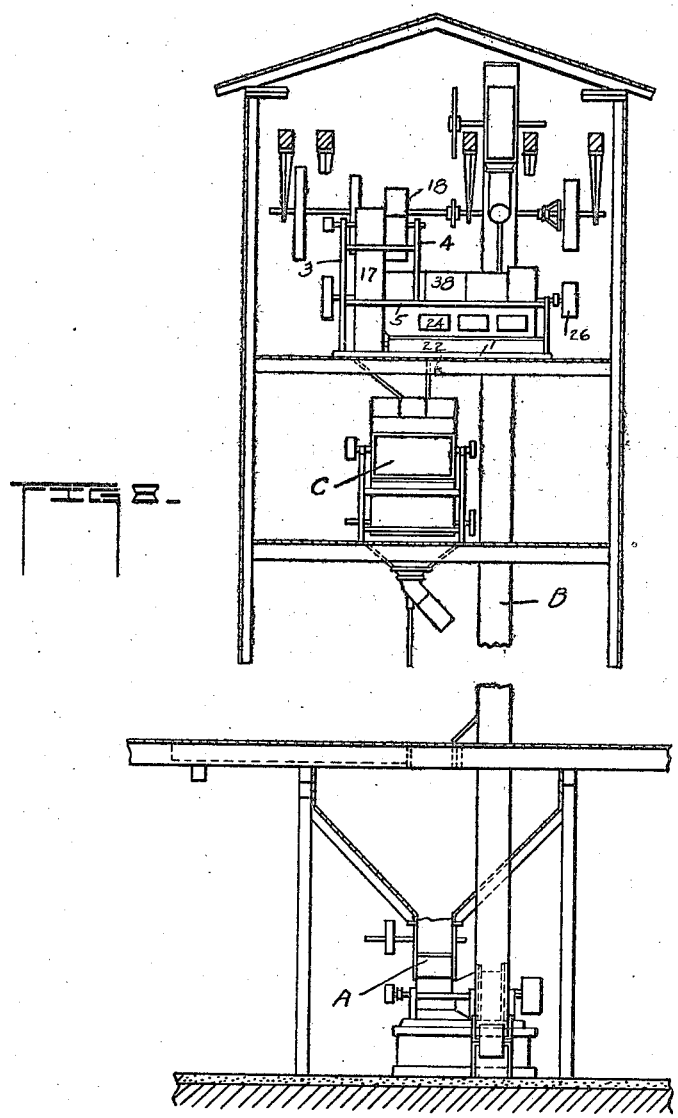

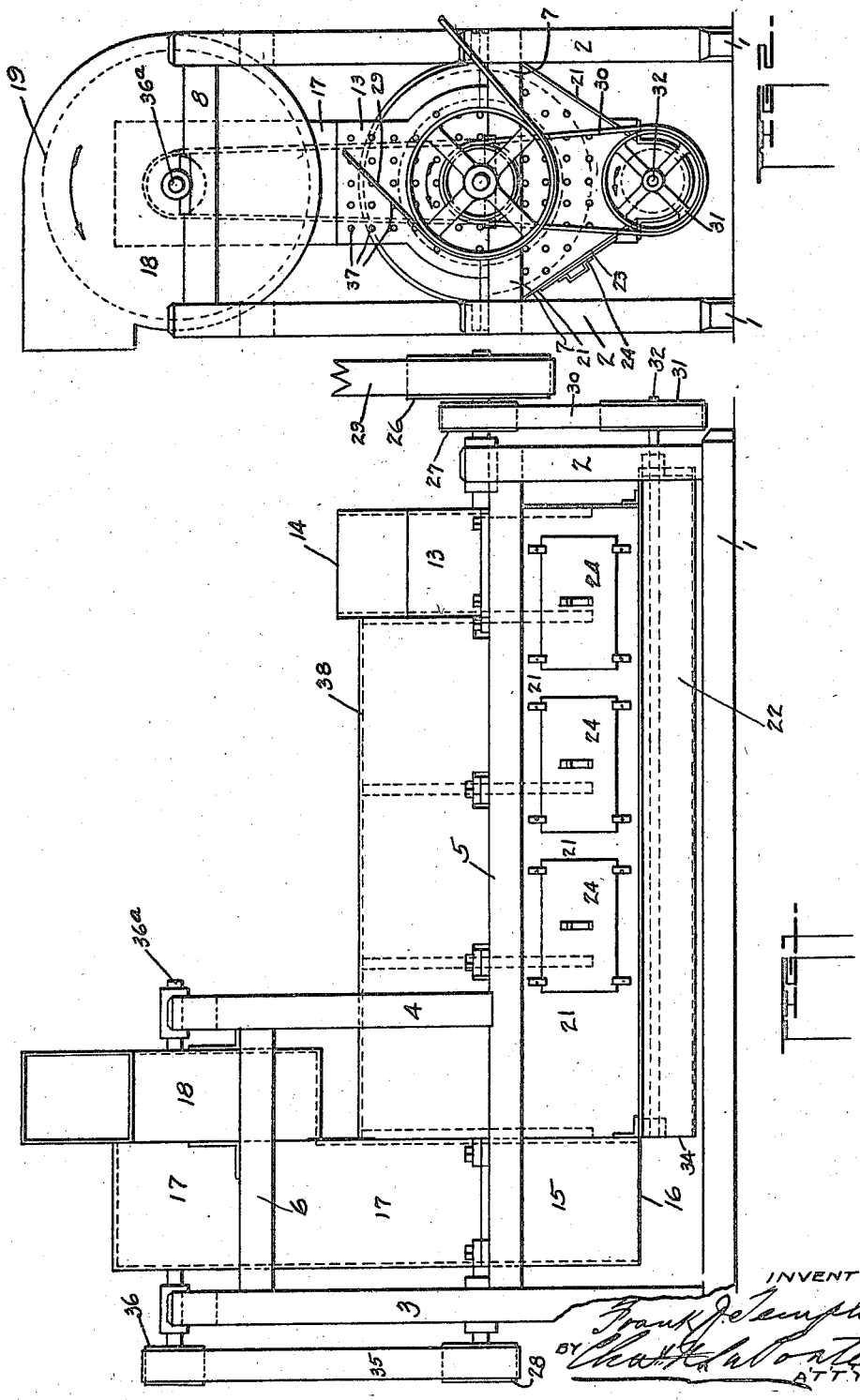

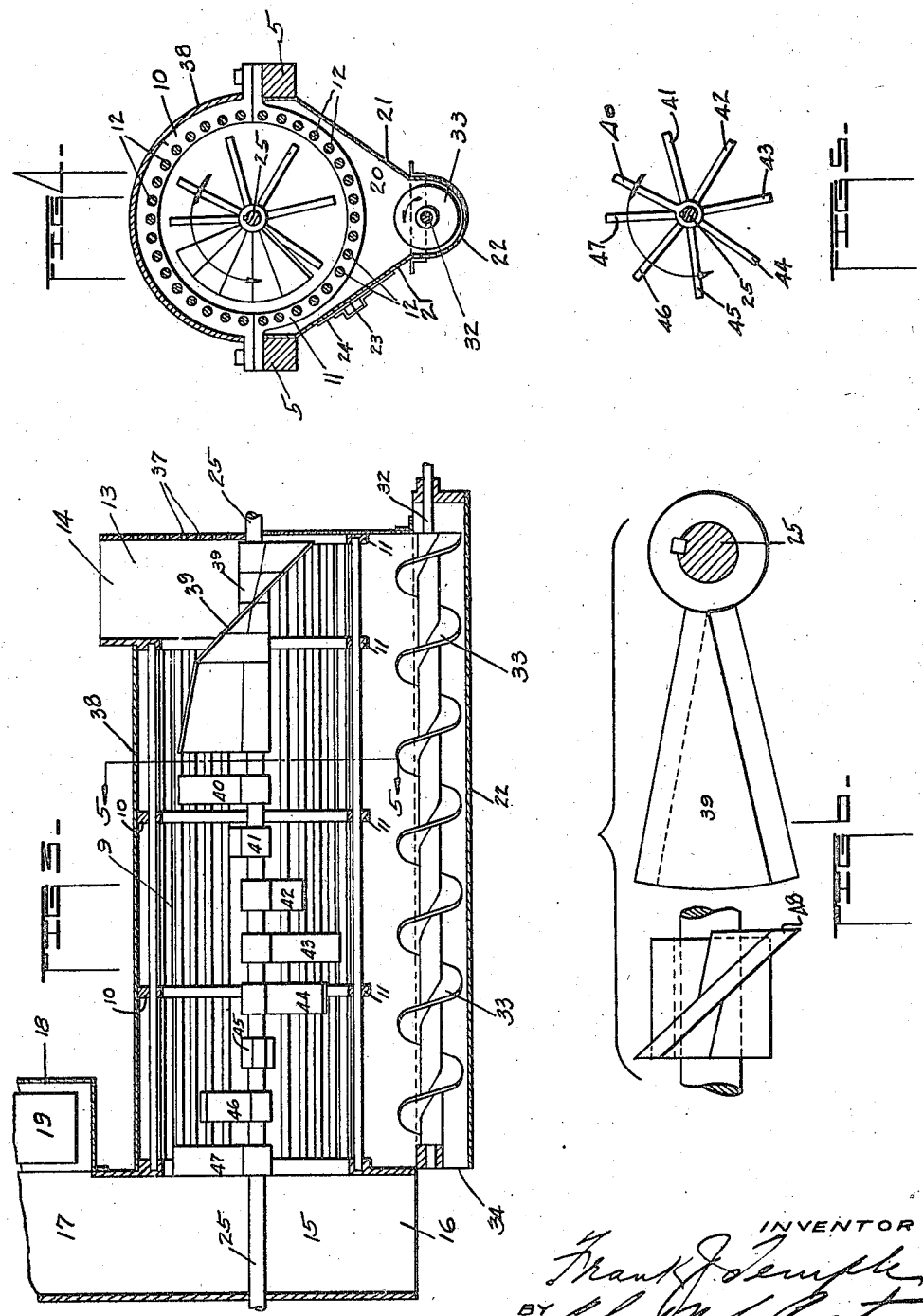

Patented July 17, 1923.

1,462,428

UNITED STATES PATENT OFFICE.

FRANK J. TEMPLE, OF DECATUR, ILLINOIS, ASSIGNOR TO UNION IRON WORKS, OF DECATUR, ILLINOIS, A CORPORATION OF ILLINOIS.

SNAPPED-CORN SEPARATOR.

Application filed July 17, 1919. Serial No. 311,640.

*To all whom it may concern:*

Be it known that I, FRANK J. TEMPLE, a citizen of the United States, a resident of Decatur, in the county of Macon and State of Illinois, have invented new and useful Improvements in Snapped-Corn Separators, of which the following is a specification.

This invention has reference to a snapped corn separator.

The principal object of the invention is to provide a machine, of the character referred to, into which is discharged shelled corn, together with cobs, shucks, silks, etc., and received from a sheller, and separate the shelled corn and cob particles from the shucks, silks and lighter materials; the shelled corn and cob particles being transferred to a cleaner, and the shucks, silks and lighter materials being drawn off, preferably by a suction fan, and delivered to any suitable place.

That the invention may be more fully understood, reference is had to the accompanying drawings forming a part of the description, in which—

Figure 1 is a side elevation of a machine embodying my invention;

Figure 2 is an end elevation of the machine, looking in at the right hand end of Figure 1;

Figure 3 is a longitudinal sectional view through the machines;

Figure 4 is a cross-section showing a certain arrangement of parts and the details of construction;

Figure 5 is a cross-section on the line 5—5 Fig. 3 to show the arrangement of the beaters;

Figure 6 shows a side and end elevation of a section of the feed;

Figure 7 is a diagrammatic side elevation of a mill equipment showing the relation my separator would have to a sheller and cleaner, and Figure 8 is a diagrammatic end elevation of the mill equipment shown in Figure 7.

Like characters of reference denote corresponding parts throughout the figures.

The working parts of the machine are supported on the floor sills or beams 1, the understanding beams or standards 2, 3 and 4, the longitudinally disposed beams 5 and 6, and the cross-beams 7 and 8.

9 designates, what I choose to call a grated casing. It comprises a plurality of pairs of semi-circular rings 10 and 11 which are bolted on the beams 5, and said semi-circular rings are provided with openings to receive the longitudinally arranged spaced rods 12, forming the grate. At the receiving end of the machine a number of the rods terminate short of the end of the machine, see Figure 3, to make provision for the inlet of the material. The inlet is preferably a casting 13 formed with a spout 14 and bolted to the beams 5. At the discharge end of the machine, a similar casting 15 (inverted) and having a spout 16, is bolted to the beams 5, and above said casting is a spout 17 communicating with a suction-fan casing 18 in which is operatively carried a suction fan 19, adapted to draw off certain of the lighter materials separated, to be delivered to any suitable point or place.

Immediately beneath the grated casing is a hopper 20 formed by the converging side walls or plates 21, which connect with the elongated semi-spherical trough section 22. The walls or plates 21 are provided with openings 23 covered by the removable plates or covers 24, which, when removed, make it possible for the trough to be cleaned, as will be understood.

25 designates a shaft extending through the grated casing and journaled in suitable bearings secured to the cross-beams at the opposite ends of the machine. On one end of said shaft are pulley wheels 26 and 27, and on the other end the pulley wheel 28. Pulley wheel 26 is driven by a belt 29 receiving its power from any suitable source, and a belt 30 operated by the pulley wheel 27 actuates a pulley wheel 31 on a shaft 32 extending through the trough 22. On said last mentioned shaft is a screw-feed 33 adapted to convey the shelled corn and cob particles received in the trough, to the discharge end 34 of said trough. The pulley wheel 28 actuates a belt 35, which in turn actuates a pulley wheel 36 on one end of a shaft 36ª, which passes through the spout 17, the casing 18, and has connected thereto and operates the fan 19.

The front wall of the casting 13 is provided with a multiplicity of openings 37 for ingress of air into the machine, and normally the upper half of the grated casing 9 is covered by the plates 38.

At the receiving end of the machine, a screw-feeder 39 is arranged on the shaft 25, this feeder preferably fills the space beneath the spout 14 in the casting 13, and extends part way into the grated casing 9, as shown in Figure 3. On the shaft 25 are also secured a plurality of beaters 40, 41, 42, 43, 44, 45, 46 and 47, the first one spaced from the end of the feeder 39 and the remaining beaters being staggered on the shaft so as to form a substantial spiral from one end of the shaft to the other. I prefer to make the feeder 39 in sections with overlapping edges, as at 48. This feeder is so constructed that it will tend to push the material through the machine.

In Figures 7 and 8, the relation my machine would have in a mill equipment is very clearly shown; wherein, A designates, what is known to the trade, as a warehouse or pitless sheller, from which the shelled corn, cobs, shucks, silks and lighter materials are discharged into an elevator B which transfers this material into the receiving hopper 14 of my machine. The action of my machine is to feed and separate the shelled corn and cobs from the shucks, silks and lighter materials. The shelled corn and the smaller and heavier particles pass down between the rods 12 into the trough 22 and are conveyed to the discharge 34 of the trough from whence it is transferred to the cleaner C, where the shelled corn is cleaned of all foreign matter. The shucks, silks and lighter materials are drawn off by the fan 19 out through the spout 17 and the casing 18 and delivered to any suitable point or place, as will be understood.

The sheller A, the elevator B and the cleaner C form no part of the present invention, and are only shown that a clear understanding may be had of the present invention and its uses.

What I claim is:—

1. In an apparatus of the character described, in combination, a frame work, a plurality of spaced sets of semi-circular rings, each provided with a plurality of openings, means to secure each set of rings to each other and to said frame work, rods passing through the openings in said rings to provide a cylindrical grate, a casing secured to said rings to provide an enclosure for said grate, a trough below the grate and in communication with the enclosure for the grate, an auger in said trough, a casting including a hopper above the receiving end of the grate and in communication therewith, the front wall of said hopper having air inlet openings, a shaft in said grate, a feeder on said shaft at the inlet end of the grate, a plurality of spaced beaters on said shaft, in spiral arrangement, and extending from the feeder to the discharge end of the grate, a suction fan at the discharge end of the grate, means to operate said shaft and auger, and means to operate said fan.

2. In a separator of the character described, in combination, a cylindrical grate including an annular row of closely spaced rods, an enclosing casing for said grate closely spaced from the rods to provide a passage therearound, a trough below the grate and in communcation with the closure for the grate, a conveyor in said trough, means to operate said conveyor, a hopper inlet above one end of said grate and in communication therewith and having air inlet openings in one wall, a spiral feeder below the hopper and within the grate, a plurality of spaced beaters within the grate, in spiral arrangement, and extending uninterruptedly from the feeder to the discharge end of the grate, a fan casing at the discharge end of the grate, a fan in said casing, means to operate said feeder and beaters, and means to operate said fan.

In witness whereof, I have hereunto affixed my hand this 28 day of June, 1919.

FRANK J. TEMPLE.